No. 795,207. PATENTED JULY 18, 1905.
A. C. EASTWOOD.
MAGNETIC BRAKE.
APPLICATION FILED MAY 2, 1905.
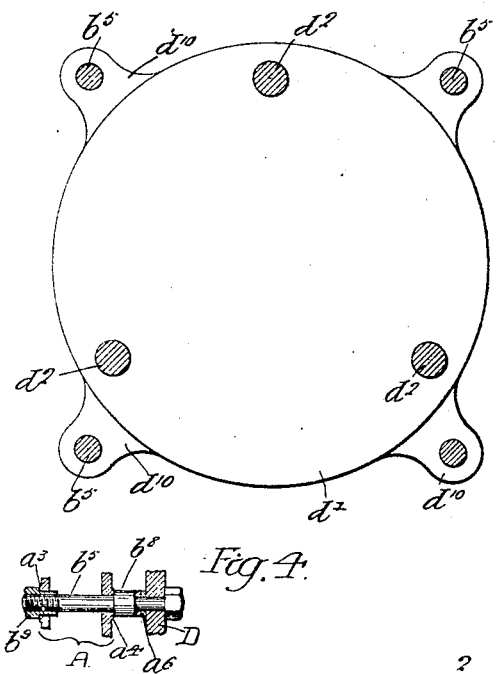
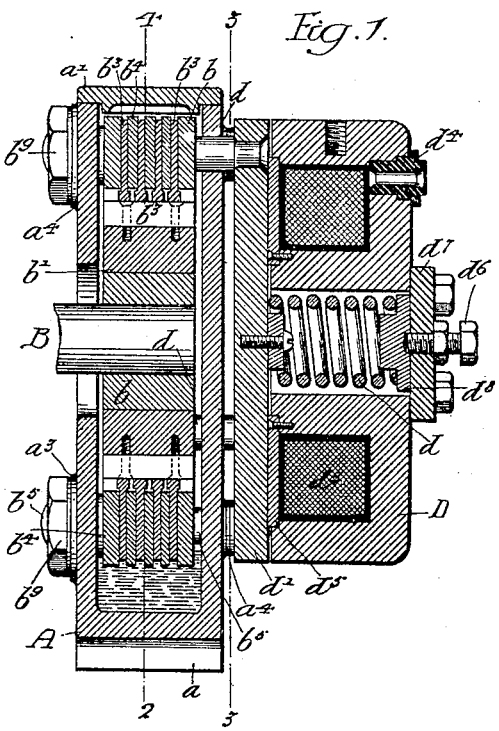
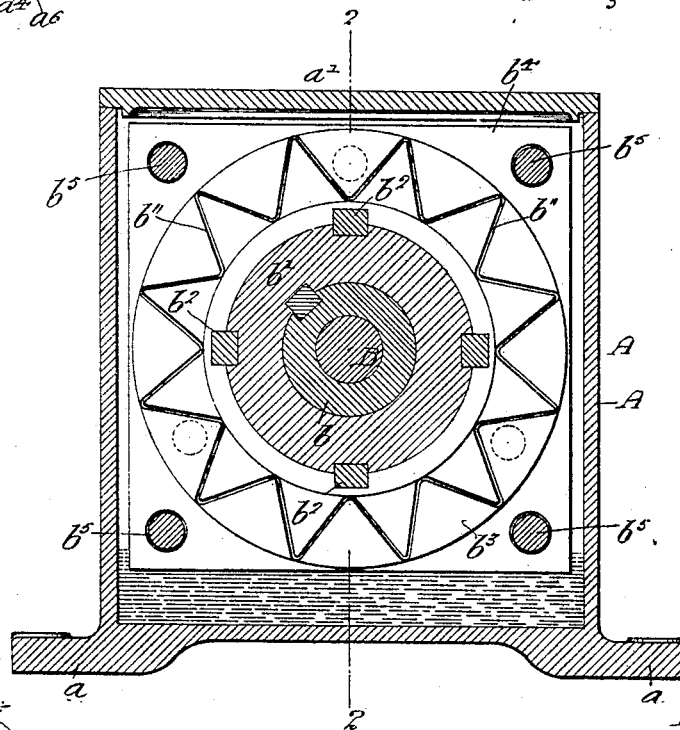
Witnesses:
Walter F. Pullinger
Augustus B. Coppes
Inventor:
Arthur C. Eastwood.
by his Attorneys
Howson & Howson No. 795,207.

Patented July 18, 1905.

UNITED STATES PATENT OFFICE.

ARTHUR C. EASTWOOD, OF CLEVELAND, OHIO.

MAGNETIC BRAKE.

SPECIFICATION forming part of Letters Patent No. 795,207, dated July 18, 1905.

Application filed May 2, 1905. Serial No. 258,560.

*To all whom it may concern:*

Be it known that I, ARTHUR C. EASTWOOD, a citizen of the United States, residing in Cleveland, Ohio, have invented certain Improvements in Magnetic Brakes, of which the following is a specification.

My invention relates to certain improvements in that form of brake in which a plurality of driven disks or plates are brought into contact with a plurality of stationary plates in order to produce a braking action. Brakes of this general type hitherto known to the art have not been utilized to any great extent for a number of reasons, among which may be mentioned their extremely high cost of production, the difficulty and consequent high expense for maintenance, the practical impossibility of inspection and adjustment, and the liability of the insulation of the electrical portion of the device to deteriorate under action of the oil employed to lubricate the various plates.

One object, therefore, of my invention is to so arrange the various parts of a device of the character above noted that it will be inexpensive to manufacture, a further object of the device being to provide a brake having an oil-chamber of adequate size and braking-plates so placed relatively thereto that uniform and efficient lubrication of the various engaging surfaces is insured. It is also desired to so construct the casing holding the friction elements that by simply removing a cover it is possible to inspect its interior and ascertain whether adjustment or lubrication is required.

A further object of my invention is to dispose the magnet-winding of the electrical portion of the brake so that it shall be inclosed in a casing separate from the chamber containing the friction-plates, thereby doing away with the possibility of the lubricating-oil therefor injuring the insulation of the winding or conductors.

These objects I attain as hereinafter set forth, reference being had to the accompanying drawings, in which—

Figure 1 is a sectional elevation of my improved brake, showing the detail construction thereof. Fig. 2 is a sectional elevation taken on the line 2 2, Fig. 1. Fig. 3 is a sectional elevation taken on the line 3 3, Fig. 1; and Fig. 4 is an elevation of one of the bolts employed in connection with my invention.

In the above drawings, A represents a casing for the friction elements or plates, which is preferably rectangular in section and has supporting lugs or feet $a$ and a removable cover $a'$. In one side of this casing is an opening for a shaft B, to which it is desired to apply the braking force, and this shaft carries a bushing $b$, keyed to a plate-carrying ring $b'$. Said ring is provided with a number of keys $b^2$, which connect to it a series of annular plates $b^3$, in the present instance four, free to move toward and from each other.

Alternating with the plates $b^3$ is a series of stationary plates $b^4$, preferably of rectangular outline and carried upon four bolts $b^5$, which pass through the casing A and serve to support at one side of the same the braking solenoid or magnet-frame D. Said plates $b^4$ are free to move toward and from each other upon these bolts, and the casing below them is constructed to form a chamber for oil. It will be noted that the two outside plates $b^4$ are heavier than the others and this construction is adopted so that pressure delivered to one plate may be uniformly transmitted to all parts of the surface of the adjacent plate as well as to the remainder of the plates.

In order to provide suitable bearing-surfaces for the plate $b^4$ most distant from the solenoid, the nuts $b^9$ are each provided with an inwardly-extending shoulder, which passes through the bolt-openings in the side of the casing, so as to project within said casing. On the outside of the casing are a series of bosses $a^3$, surrounding the holes for the bolts $b^5$ and faced off so as to all lie in the same plane. As the inwardly-extended shoulders of the bolts are all made of exactly the same length, it will be seen that they provide an inexpensive and efficient support for said plate $b^4$.

The casing D of the solenoid is annular in form and has within it a spiral spring $d$, placed to press an armature-plate $d'$ toward the casing A. There are, however, fastened to and carried by this plate three studs $d^2$, which project through openings in the adjacent side of the casing and engage one of the heavy stationary friction-plates $b^4$. Within a suitable annular space of the casing D is a winding $d^3$, there being a suitable insulating-bushing $d^4$ through an opening in the outer face of the casing D to permit of the entrance of the electrical connections for said winding.

Under operating conditions the lower portions of the plates $b^3$ and $b^4$, within the casing A, are submerged in a body of oil, which not only keeps said plates lubricated, but tends to dissipate the heat generated by the friction between them when the brake is applied.

As long as a predetermined current is flowing through the winding $d^3$ the armature-plate $d'$ is attracted toward the frame D against the action of the spring $d$, and the shaft B, with its plates $b^3$, is free to turn without interference from the plates $b^4$. When, however, current is cut off from the winding, the spring $d$ forces the plate $d'$ toward the casing A, and consequently causes the studs $d^2$ to press upon the adjacent stationary plate $b^4$, with the result that all of the plates of both sets are uniformly pressed together between said studs $d^2$ and the ends of the nuts $b^9$, and a braking force is exerted upon the shaft B.

One of the bolts $b^5$ is shown on a reduced scale in Fig. 4, and it will be seen that these are provided with a shoulder $b^8$ and an extension beyond the same, on which is supported the magnet-frame in such position that the studs $d^2$, fixed to the armature-plate $d'$, are free to move through the openings in the side of the casing A.

Not only is there no possibility for the lubricant in the casing A to flow into the vicinity of the magnet-winding $d^3$, but in addition said winding is sealed within its casing by means of an annular plate $d^5$, preferably of brass or other non-magnetic material, which projects slightly beyond the face of the iron frame D, so as to prevent possible sticking of the armature-plate $d'$ thereto.

The force exerted by the spring $d$ may be adjusted, as desired, by means of a screw $d^6$, passing through a plate $d^7$, placed over the cavity of the frame D, in which said spring acts.

It is to be noted that the use of the shouldered nuts $b^9$ in combination with the bosses $a^3$ does away with the necessity for having finished surfaces within the casing A, and consequently reduces the expense of construction to a minimum. In addition I provide a second set of bosses $a^4$ on the face of the casing A adjacent to the frame D, so as to provide a suitable bearing or support for the shoulders $b^8$ of the bolts $b^5$. With such a construction it will be seen that said bolts are exactly parallel to each other, and therefore provide suitable bearings for the plates $b^4$, it being noted that the use of these bolts in place of keys materially tends to simplify and cheapen the construction of the device.

The driven plates $b$ are preferably of brass and are provided with reversely-disposed oil-grooves $b^{11}$ on each face, so arranged that the plates in revolving carry oil from the lower portion of the casing A and distribute it over their friction-surfaces.

By employing a bushing $b$, interposed between the shaft B and the plate-carrying ring $b'$, I am enabled to build and assemble the various parts of the brake in quantity, boring and key-seating said bushings to suit whatever special conditions may arise.

Liners in the form of washers $a^6$ may be placed on the bolts $b^5$ between the shoulder $b^8$ and the lugs $d^{10}$ of the magnet-frame D, with which said bolts engage, so that as the friction-plates wear and the air-gap between the armature-plate $d'$ and said magnet-frame increases said liners may be removed from time to time in order to keep said air-gap constant.

I claim as my invention—

1. A brake including a frame supporting a plurality of bolts, a set of friction-plates on the bolts, a shaft, a second set of friction-plates connected to the shaft, means for pressing together said two sets of plates, and means for releasing said plates, substantially as described.

2. A brake including a casing, a plurality of substantially parallel bolts extending within the casing, two sets of friction-plates alternating with each other in the casing, one set being carried on said bolts so as to be free to move laterally while being prevented from rotating, a magnet-winding having an armature, a spring acting upon the armature in opposition to the magnet-winding, and means for transmitting pressure from the armature to said friction-plates, substantially as described.

3. The combination of a casing having an opening in its upper portion, a removable cover therefor, a set of friction-plates in the casing having means for preventing their revolution while permitting them to move toward and from each other, a shaft having a second set of friction-plates, means for pressing together said two sets of plates, and means for releasing the plates, substantially as described.

4. In a brake, the combination of a casing, a plurality of bolts therein, a set of friction-plates movable toward and from each other on said bolts, a shaft, a second set of friction-plates on said shaft, means for pressing together said two sets of plates and means for releasing said plates, said casing being open at the top and having a removable cover, substantially as described.

5. The combination in a brake, of a casing, a series of relatively stationary plates supported therein independently of the inside surfaces thereof, a shaft, a second series of plates fixed to said shaft, a spring having means for forcing together said two series of plates, and a magnet for counteracting the effect of said spring, substantially as described.

6. The combination of a casing, a series of relatively stationary friction-plates supported therein, a shaft having a second series of friction-plates, a plate external to the casing having means engaging a plate in the casing, a spring acting on said external plate to press together said friction-plates, and a magnet placed to act in opposition to said spring, substantially as described.

7. The combination of a casing, a series of parallel bolts extending through and projecting beyond the same, a series of friction-plates carried on said bolts in the casing, a magnet carried on the bolts outside of the casing, an armature for the magnet, a shaft having a second series of friction-plates within the casing, studs connected to the armature and acting upon the plates in the casing, with a spring acting on said armature in opposition to the magnet, substantially as described.

8. The combination of a casing having extending through it a series of bolts, a series of rectangular plates carried in the casing on said bolts, a shaft having a series of substantially circular plates alternating with said rectangular plates, a magnet, an armature therefor, a spring placed to act upon the armature in opposition to the magnet, and means for transmitting the pressure from the spring to the plates in the casing, substantially as described.

9. The combination of a casing, a series of bolts extending through and projecting beyond said casing, a magnet carried on the projecting portions of said bolts, a series of plates carried by the bolts inside of the casing, a revoluble member extending into the casing and having a second series of plates alternating with the plates on the bolts, an armature carried between said magnet and the casing, a series of studs extending through the side of the casing into engagement with one of the plates therein, and a spring acting upon said armature in opposition to the magnet, substantially as described.

10. The combination of a casing having within it two sets of friction-plates, a revoluble shaft connected to one set of said plates, a series of bolts engaging the second series of plates to prevent revolution of the same, means for pressing said two sets of plates together, and means for releasing said plates, said bolts extending beyond the casing and supporting the said releasing means, substantially as described.

11. The combination of a casing having a series of bolts extending through it, said casing having finished surfaces for engagement with the nuts and head portions of said bolts, a series of plates carried by said bolts within the casing, a shaft having a second series of plates alternating with said first series, a magnet, an armature therefor, a spring acting on said armature in opposition to the magnet, and means for transmitting pressure from the armature to said plates, substantially as described.

12. The combination of a casing, two series of friction-plates, one series being fixed to the casing and the other having a supporting-shaft, a series of bolts carried by the casing, a magnet supported thereby, an armature supported between the magnet and the casing, a spring acting on the armature, means for transmitting the pressure from the armature to the plates within the casing, and means for varying the distance between the magnet and the casing, substantially as described.

13. The combination of a casing, two series of friction-plates, one series being fixed to the casing and the other having a supporting-shaft, a series of bolts carried by the casing, a magnet supported thereby, an armature supported between the magnet and the casing, a spring acting on the armature, means for transmitting pressure from the armature to the plates within the casing, and a series of removable washers on the bolts between the magnet and the casing, substantially as described.

14. The combination of a casing having a removable cover, two series of plates in the casing, means for preventing revolution of one series of plates, means for revolubly supporting the second series of plates, a magnet outside of the casing, an armature between the magnet and the casing, a series of studs connected to the armature and projecting into the casing into engagement with one of the stationary plates, and a spring acting upon said armature in opposition to the magnet, substantially as described.

15. The combination of a frame, a series of bolts supported thereby, a series of relatively stationary plates carried by said bolts, nuts for the bolts having faces all lying in the same plane and abutting upon one of said plates, a series of revoluble plates placed to coact with the stationary plates, means tending to press said plates together toward said nuts, and means for releasing said plates, substantially as described.

16. The combination of a casing, a series of bolts extending therethrough, nuts for the bolts having portions extending into the casings, two series of plates in the casing, one carried on the bolts and the other having revoluble supporting means, an armature-plate, a spring acting to clamp the plates between said nuts and the armature-plate, and a magnet placed to act on the armature-plate to release the plates, substantially as described.

In testimony whereof I have signed my name to this specification in the presence of two subscribing witnesses.

ARTHUR C. EASTWOOD.

Witnesses:
 WM. E. SHUPE,
 JOS. H. KLEIN.